United States Patent [19]

Buffaloe

[11] Patent Number: 5,769,593
[45] Date of Patent: Jun. 23, 1998

[54] RAMP SYSTEM FOR VAN

[76] Inventor: Richard H. Buffaloe, 932 Aqua Vista Dr., Killen, Ala. 35645

[21] Appl. No.: 748,284

[22] Filed: Nov. 13, 1996

[51] Int. Cl.$^6$ ........................................... B60P 1/43
[52] U.S. Cl. ........................... 414/537; 296/57.1; 296/61
[58] Field of Search ........................ 414/537, 538; 296/61, 62, 57.1; 14/71.1

[56] References Cited

U.S. PATENT DOCUMENTS

| | | | |
|---|---|---|---|
| 2,380,091 | 7/1945 | Watter | 414/537 |
| 2,523,723 | 9/1950 | Sartee et al. | 414/537 |
| 2,721,758 | 10/1955 | Allen | 414/537 X |
| 2,984,371 | 5/1961 | Koffel et al. | 414/537 |
| 3,756,440 | 9/1973 | Raap et al. | 414/537 |
| 4,084,714 | 4/1978 | Williams | 414/537 X |
| 4,088,235 | 5/1978 | Thacker | 414/537 |
| 4,098,414 | 7/1978 | Abiera | 414/537 |
| 4,475,761 | 10/1984 | Milroy et al. | 414/537 X |
| 4,944,546 | 7/1990 | Keller | 414/537 X |
| 5,035,565 | 7/1991 | White | 414/537 |

FOREIGN PATENT DOCUMENTS

| | | | |
|---|---|---|---|
| 718231 | 11/1931 | France | 414/537 |

*Primary Examiner*—David A. Bucci
*Attorney, Agent, or Firm*—John C. Garvin, Jr.

[57] ABSTRACT

A ramp system attached to a load carrying vehicle having a flat bed or floor, a rear door pivotally attached along a horizontal axis to the flat bed, and at least one ramp assembly pivotally secured along a horizontal axis to a hinge bar fixed to the rear door. The combination of the rear door and the one or more ramp assemblies constitute a sloped surface for use during the loading and unloading of goods from and to the load carrying vehicle. Each ramp assembly can be readily extended for loading and unloading purposes and locked to the interior surface of the rear door of the load carrying vehicle in a generally vertical position when not being used for loading and unloading purposes.

19 Claims, 4 Drawing Sheets

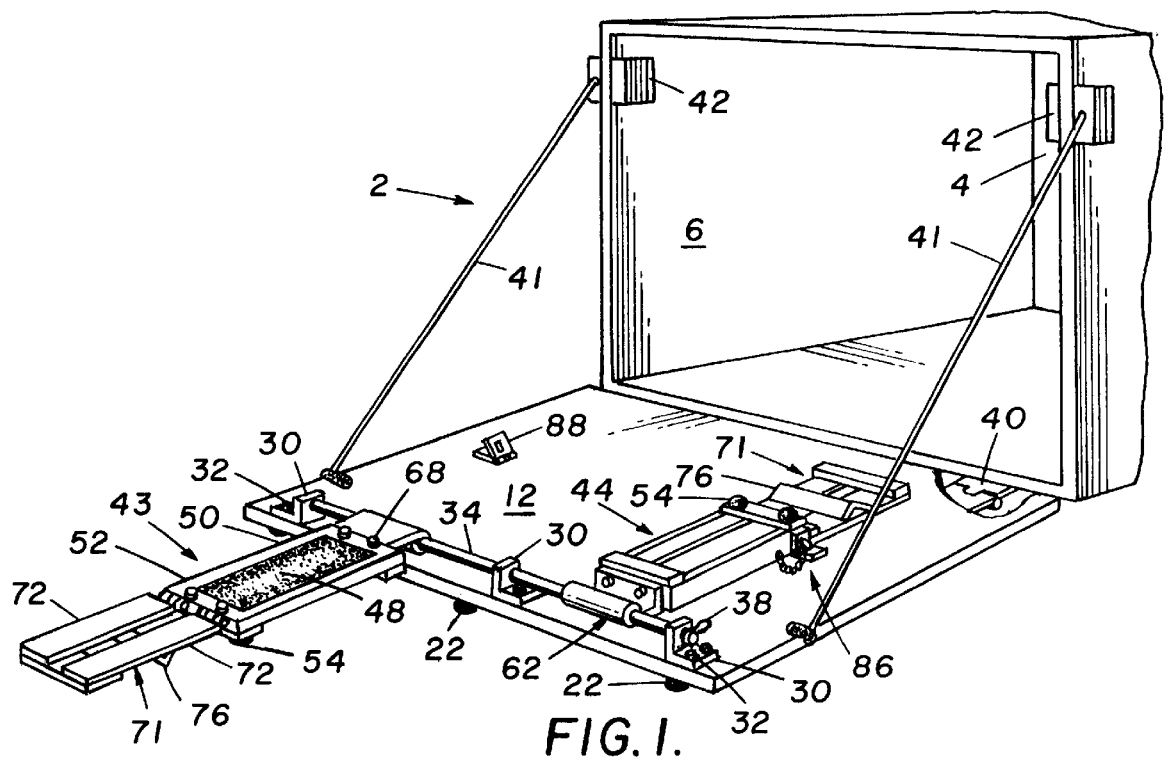
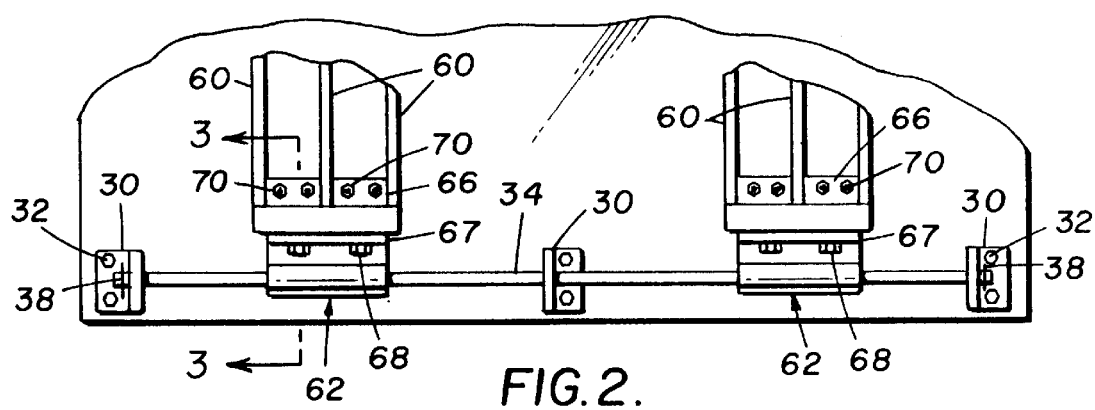
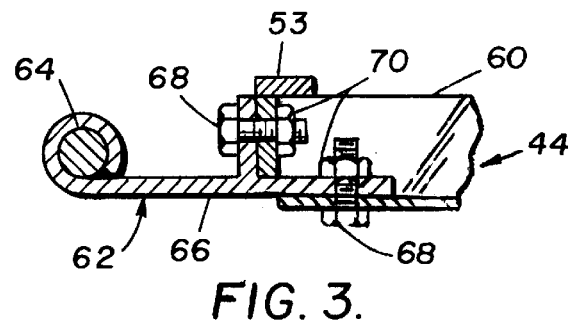

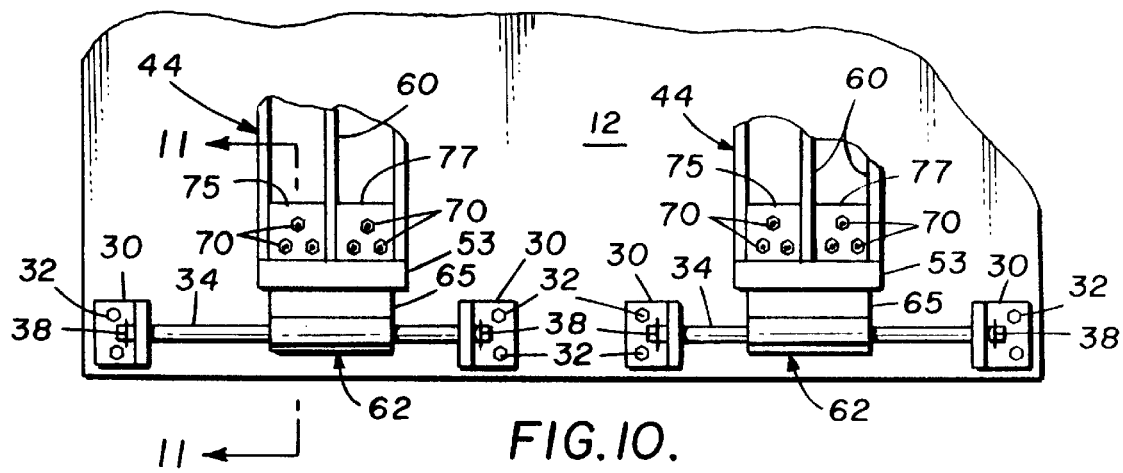
FIG.10.
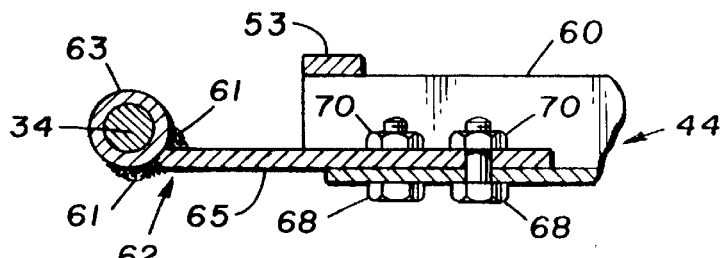
FIG.11.
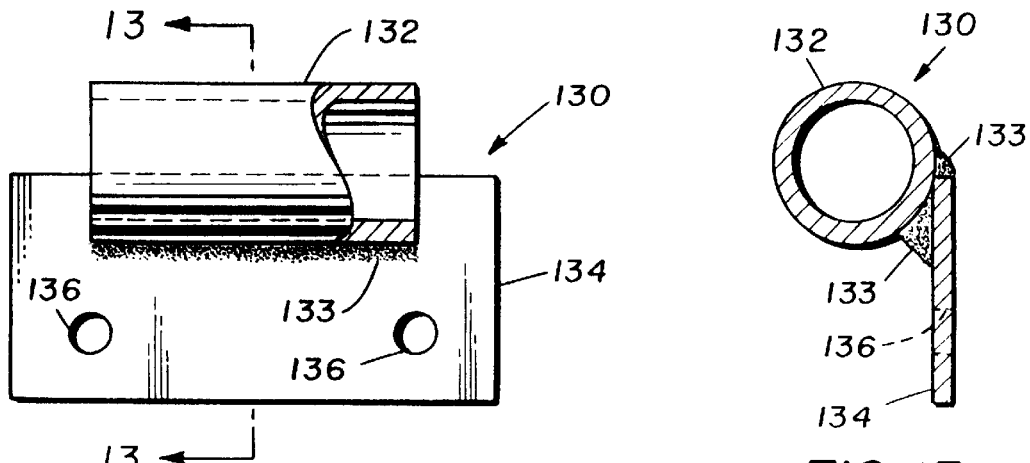
FIG.12.
FIG.13.

RAMP SYSTEM FOR VAN

FIELD OF THE INVENTION

The present invention relates generally to a ramp system for load carrying vehicles, and more particularly to a ramp system for a closed van for loading, unloading and transporting vehicles such as race cars, which ramp system is compactly stored in a generally vertical position to take up very little space when the ramp system is not being used for loading and unloading purposes and during transit on the load carrying vehicle.

BACKGROUND OF THE INVENTION

The usefulness of providing ramp systems for vehicles such as closed vans, flat bed trailers and pick-up trucks to load and unload materials has long been known in the art. Those ramp systems disclosed in the following United States patents are exemplary of such ramp systems: Des. U.S. Pat. No. 354,603 to Bullard; U.S. Pat. No. 3,517,791 to Miles; U.S. Pat. No. 4,088,235 to Thacker; U.S. Pat. No. 4,098,414 to Abiera; U.S. Pat. No. 5,035,565 to White; U.S. Pat. No. 5,096,362 to Best; U.S. Pat. No. 5,145,310 to Calzone; U.S. Pat. No. 5,257,894 to Grant; and U.S. Pat. No. 5,306,113 to Mann.

U.S. Pat. No. Des. 354,603 to Bullard discloses a vehicle loading ramp assembly having two ramps removably connected to a longitudinal bar mounted on the aft area of a truck. U.S. Pat. No. 3,517,791 to Miles discloses a pair of ramps for loading and unloading cargo including a vehicle from a van or truck. U.S. Pat. No. 4,088,235 to Thacker discloses a ramp system for loading and unloading land vehicles onto and off of a truck, flat bed or the like, which ramp system is demountable from the truck, flat bed or the like such that the ramp system will not interfere with the operation of the truck, flat bed or the like. U.S. Pat. No. 4,098,414 to Abiera discloses a pair of loading ramps adapted for coupling to the tailgate of a pick-up truck for loading and unloading purposes, which ramps are storable on the side walls of the pick-up truck to provide extensions of the side walls of the truck. U.S. Pat. No. 5,035,565 to White discloses a hinge bar connector assembly for connecting ramps in numerous positions along the periphery of a flat bed truck for loading and unloading materials onto and off of the flat bed truck. U.S. Pat. No. 5,096,362 to Best discloses a ramp attached to and used for loading and unloading goods onto and off of a truck, which ramp may be folded compactly and latched in an upright position at the rear of the truck. U.S. Pat. No. 5,145,310 to Calzone discloses a trailer having a ramp assembly that can be pivoted from a position of transport, where the ramps are folded back to rest on the trailer bed when not in its loading and unloading position, to a position for loading equipment, which ramp assembly includes spring means for making it easier for the operator to lift portions of the ramp assembly when placing the ramp assembly in the loading and unloading position from the transport position. U.S. Pat. No. 5,257,894 to Grant discloses a stowable, extendable, ramp assembly for vehicles, which vehicle includes a stowing chamber for receiving the stowable, extendable, ramp assembly when the ramp assembly is not in its loading and unloading position. U.S. Pat. No. 5,306,113 to Mann discloses a ramp system apparatus which is an integral part of a flat bed trailer, which apparatus includes a first ramp segment extending rearwardly from the trailer, at least one transition ramp segment, and a tail ramp segment pivotally secured to the aft end of the transition ramp segment.

The prior art also includes a van or trailer for hauling race cars and similar vehicles, which van or trailer has a rear door horizontally pivoted to the aft end of the bed of the van or trailer and a sheet of metal removably secured to the rear door, with the rear door and the removable sheet of metal forming a ramp for the loading and unloading of race cars or similar vehicles into and out of the interior of the van or trailer. In this prior art device, the metal sheet must be attached to the rear door by numerous screws to load or unload race cars or similar vehicles with the screws having to be removed and the screws and metal sheet being stored somewhere in the van during periods when the van or trailer is transporting or merely storing a race car or similar vehicle.

While there are numerous ramp systems in the prior art which are useful in loading and unloading materials from vehicles, most are extremely complex, and all suffer from numerous deficiencies and disadvantages. The primary deficiency or disadvantage resides in the fact that none of the known prior art ramp systems are permanently attached to the horizontally, pivoted, rear door of a van or trailer to form an extension of the door for ramp purposes, and are foldable to rest and be latched against the interior of the rear door in an out of the way place, and taking up very little space, when the van or trailer is used for transporting or storing the race car or similar vehicle.

The present invention provides an improved ramp system that fills the need for a simple, effective, easy to use, ramp system which does not require any assembly for use, and can be easily and readily pivoted between its loading and unloading position and its position of storage in a generally upright, vertical, condition.

SUMMARY OF THE INVENTION

The ramp system disclosed herein is of extremely simple construction and of highly effective design that can be easily and readily pivoted between a loading and unloading position and a storage position. The present invention generally comprises a load carrying vehicle having a flat bed or floor and a rear door horizontally pivoted to the flat bed or floor, and at least one ramp assembly pivotally secured to one or more hinge bars along a horizontal axis to the rear door. The ramp assembly generally includes an upper or main ramp segment and a lower or secondary ramp segment with the upper or main segment being pivotally connected to the rear door such that the combination of the rear door and ramp assembly constitute a sloped surface for use during the loading or unloading of materials from the load carrying vehicle. Each ramp assembly can be readily extended for loading or unloading purposes and latched to the interior surface of the rear door in a generally vertical position for storage when not being used for loading or unloading purposes. The ramp assembly can be used singularly or in pairs for loading and unloading purposes. When used for loading and unloading vehicles such as race cars, the ramp assembly is normally used in pairs, with each ramp assembly being readily adjustable along the one or more hinge bars such that they are separated the same distance as the wheelbase of the transported vehicle.

It is an object of the present invention to provide a sturdy and durable ramp system which can be stored easily and compactly.

It is a further object of the present invention to provide a sturdy and durable ramp system which includes the rear door of a load carrying vehicle and at least one ramp assembly that may be latched to the interior of the rear door in a vertical position for storage when not being used for loading or unloading purposes.

It is an additional object of the present invention to provide a relatively inexpensive ramp system which is sturdy and durable and movable between its loading or unloading position and its stored, latched, position very quickly.

Other objects, features and advantages of the present invention will become apparent from the following detailed description and from the appended drawings in which the like numbers have been used to describe like parts throughout the several views.

BRIEF DESCRIPTION OF THE DRAWINGS

FIG. 1 is a partially broken away, perspective, view of a pair of ramp assemblies of the present invention secured to the rear opened door of a van or trailer for transporting vehicles such as race cars and illustrates one ramp assembly in an extended position and one ramp assembly in a folded, stored position.

FIG. 2 is a partially broken away, plan, view of a pair of ramp assemblies hingedly secured to a hinge bar fixed to the rear door of the van or trailer and illustrating the three L-shaped hinge bar brackets for securing the hinge bar to the inside surface of the rear door.

FIG. 3 is a sectional view taken along line 3—3 of FIG. 2 showing some details of the bearing element for hingedly securing the upper ramp segment to the hinge bar.

FIG. 10 is a partially broken away, plan, view of a second embodiment of a pair of ramp assemblies hingedly secured to a respective hinge bar fixed to the rear door of the van or trailer and illustrating the three L-shaped hinge bar brackets for securing the hinge bars to the inside surface of the rear door.

FIG. 11 is a sectional view taken along line 10—10 of FIG. 10 showing some details of the bearing element in the second embodiment of the invention as depicted in FIG. 10.

FIG. 12 is a plan view of an alternative hinge bar bracket for securing the one or more hinge bars to the inside surface of the rear door of the van or trailer.

FIG. 13 is a sectional view along line 13—13 of FIG. 12 of the alternative hinge bar bracket for securing the one or more hinge bars to the inside surface of the rear door of the van or trailer.

BRIEF DESCRIPTION OF THE PREFERRED EMBODIMENT

Figure 7:
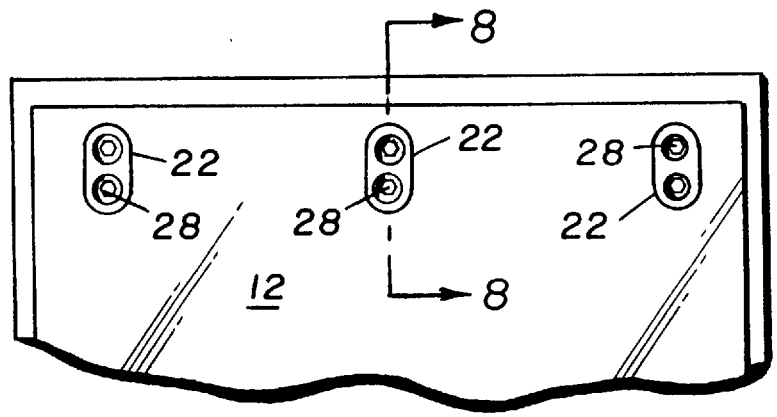
FIG. 7 is a partial elevational, broken away, view of the rear door of a van or trailer in a closed position showing three elastomeric bumpers or supports secured to the upper section of the door for support of the door on the ground when the door is in its opened, lowered, position.
Figure 8:
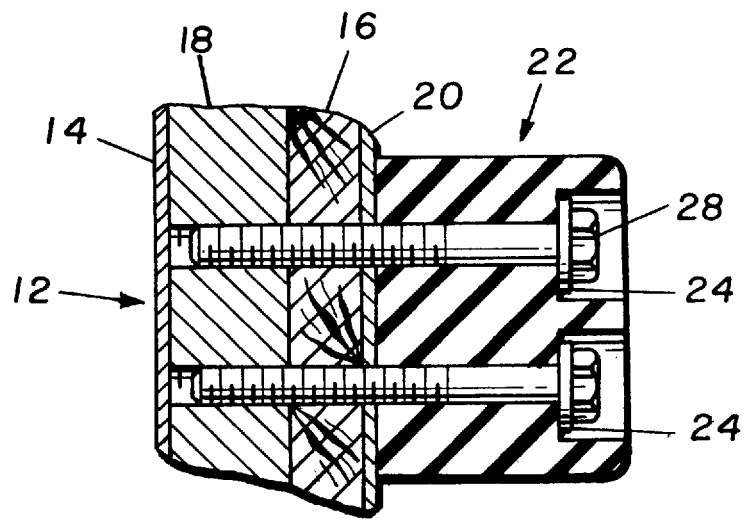
FIG. 8 is a partial broken away, sectional, view taken along line 8—8 of FIG. 7 showing the details of the rear door of the van or trailer and one elastomeric bumper or support and how it is secured to the outer surface of the rear door.

Referring now to the drawings, and in particular to FIG. 1, there is depicted a van or trailer 2 including a closed front end wall 4, a pair of side walls 6, a floor or bed (not numbered) having an aft end (not numbered), a rear door 12 hingedly secured along a horizontal axis to the aft end of floor by one or more conventional hinges 40. As best seen in FIG. 8, rear door 12 comprises an inner aluminum sheet 14, a steel sheet 18, a sheet of plywood 16, and an outer aluminum sheet 20. As best shown in FIGS. 7 and 8, three generally rectangular elastomeric bumpers 22, each of which is secured to the rear door 12 by use of large washers 24, and threaded bolts 28 whose threads are tapped into respective openings (not numbered) in steel sheet 18. The elastomeric bumpers 22 serve to support the aft end of the rear door 12 when it is in its opened, lowered, position for loading and unloading purposes.

As best seen in FIGS. 1 and 2, three L-shaped brackets 30 are secured to the aft end of rear door 12 by threaded bolts 32 which pass through openings (not shown) in each L-shaped bracket 30 and are tapped into respective openings (not shown) in steel sheet 18 of rear door 12. A cylindrical hinge bar 34 is mounted within round openings (not numbered) in each of L-shaped hinge bar brackets 30 through use of hair pin cotter keys 38 which pass through radial slots (not numbered) in the ends of hinge bar 34. Two cables 41, each having one of its ends secured to the aft end of rear door 12 with its other end secured to a counterbalance or spring motor 42 mounted on the upper section of a respective side wall 6 of van or trailer 2 are provided to assist a person when lifting the rear door 12, which is very heavy in that it contains the sheet of steel 18. Counterbalances or spring motors 42 are readily available from several sources and it has been found that Model No. B596 manufactured and sold by Cargo Systems, Inc., 30855 U.S. 20 West, Elkhart, Ind. is suitable for this purpose.

Figure 4:
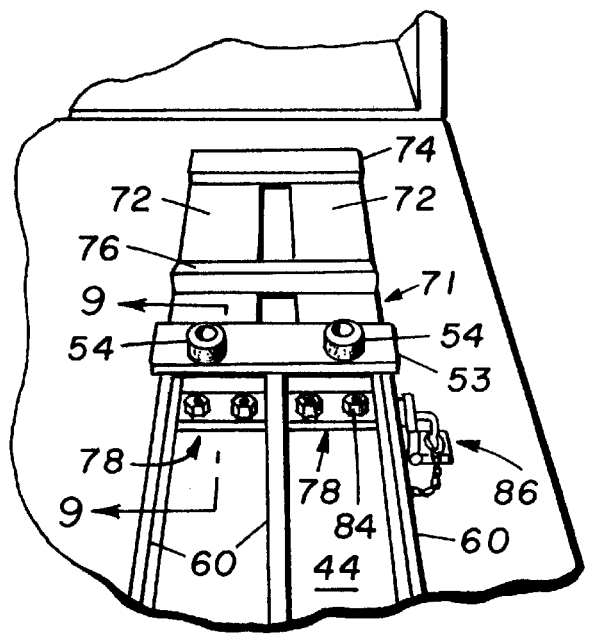
FIG. 4 is a partially broken away, pictorial plan, view illustrating one ramp assembly in a folded, stored, position locked onto the inner surface of the rear door of the van or trailer.
Figure 5:
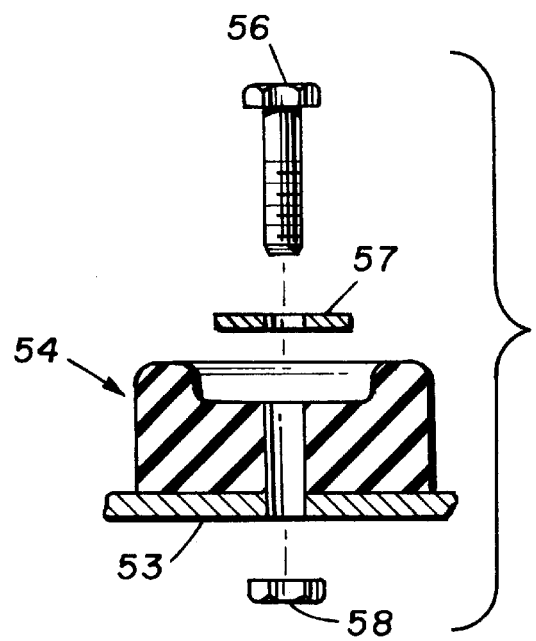
FIG. 5 is a sectional, exploded, view of the rubber bumpers or supports shown in FIG. 4.
Figure 9:
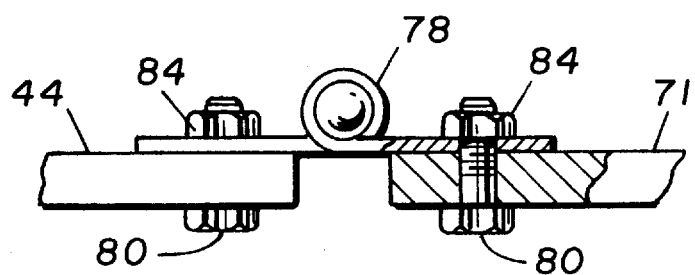
FIG. 9 is a partial broken away, sectional, view showing the details of the hinge and its connections to the upper and lower ramp segments.

Each ramp assembly 43 comprises an upper ramp segment 44, a bearing element 62, a lower ramp segment 71 and a hinge 78 (FIGS. 1 and 4). As best seen in FIGS. 1–5, each upper ramp segment 44 includes an upper surface (not numbered) having an elongated strip 48 of abrasive material secured thereto for traction purposes, an upper end portion 50, a lower end portion 52, a cross member 53 (FIGS. 3, 4 and 5), a pair of elastomeric bumpers 54, each secured to cross member 53 by a threaded bolt 56, a washer 57 and a threaded nut 58, and a plurality of longitudinal reinforcing members 60. As best seen in FIGS. 2 and 3, there is provided a pair of bearing element 62 having an opened channel 64 at one end, a generally flat first plate 66 and a second plate 67. As best seen in FIG. 2, each generally flat plate 62 is split or divided such that portions thereof can be positioned on each side of the middle, longitudinal, reinforcing member 60 of each upper ramp segment 44. Each bearing element 62 is secured to the upper end portion 50 of a respective upper ramp segment 44 by means of a plurality of threaded bolts 68 and threaded nuts 70 and is hingedly connected to hinge bar 34 by passing the hinge bar 34 through opened channel 64 of bearing element 62. As best seen in FIGS. 1 and 4, each lower ramp segment 71 includes a pair of spaced side rails 72 connected by a cross member 74 and one or more triangular shaped braces 76. As best seen in FIGS. 1, 4 and 9, the lower end portion 52 of upper ramp segment 44 is hingedly connected to the lower ramp segment 71 by means of a hinge 78, a plurality of threaded bolts 80 and a plurality of threaded nuts 84.

Figure 6:
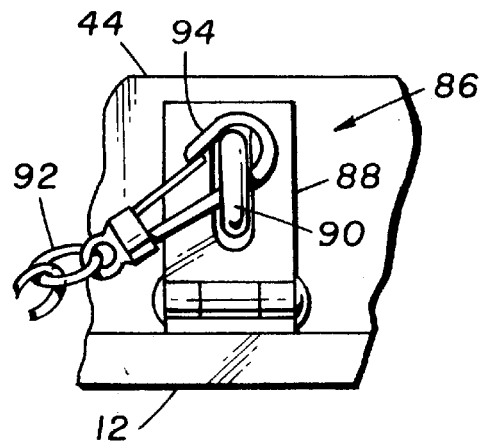
FIG. 6 is a partial elevational view illustrating a hasp and fastener clasp for securing a ramp assembly to the inner surface of the rear door of the van or trailer in a folded, stored, position.

As best seen in FIGS. 1, 4 and 6, each ramp assembly 43 is latched onto the inner surface of rear door 12 when it is in its stored position by means of a hasp 86 and fastener or clasp 94. Hasp 86 includes a female portion 88 which is secured to rear door 12 by threaded screws (not shown) tapped into the steel sheet 18 of door 12, and a male portion 90 which is secured to the outermost longitudinal reinforcement member 60 by means of threaded sheet metal screws (not shown). The fastener or clasp 94 is secured to a chain 92 which is anchored to the outermost reinforcing member 60 of ramp segment 44 by any conventional means such as sheet metal screws or a threaded bolts and nuts.

In operation, the ramp assembly 43 can be used singularly or in pairs. One ramp assembly 43 might be used when loading or unloading materials or cargo other than vehicles. Of course, a motorcycle which does not have spaced wheelbases could be loaded and unloaded on a single ramp assembly 43 as could four wheel vehicles. When used to load and unload vehicles such as race cars having spaced wheelbases, a pair of ramp assemblies 43 would preferably be used and they can be readily adjusted horizontally along hinge bar 34 by a sliding movement to correspond to the wheelbase of a vehicle being loaded or unloaded. The three large elastomeric bumpers 22 fixed to the rear door 12 supports the door 12 when the door 12 is in its opened, lowered, position. As is apparent, the combination of door 12, the upper ramp segment 44 and the lower ramp segment 71, provides a gentle, sloped, ramp system that can be quickly and readily used for loading and unloading purposes when the door 12 is opened and one or more of the ramp assemblies 43 is unlatched and pivoted to its loading and unloading position. As is further apparent, each ramp assembly 43 can be pivoted about hinge bar 34 until it rests upon the inner aluminum sheet 14 of door 12 and then moved outwardly towards the female portion 88 of hasp 86 and latched thereto by passing the fastener clasp 94 through the opening in the male portion 90 of hasp 86. The door 12 can then be raised to a closed, vertical, position with each ramp assembly being fixed to the rear door in a vertical position, but taking up limited space within the van. To unload vehicles, a person merely has to open the rear door 12, pivot rear door 12 to its opened, lowered, position, and each ramp assembly 43 is then unlatched and pivoted to an extended position and adjusted to match the wheelbase of the vehicle to be unloaded. The vehicle to be unloaded is then driven from the van or trailer down the ramp made up or rear door 12 and two ramp assemblies 43.

A second embodiment of a pair of ramp assemblies hingedly secured to separate hinged bars fixed to the rear door of a van or trailer is depicted in FIGS. 10 and 11, with like parts being designated with the same reference numerals as used with the first embodiment depicted in FIGS. 1–9. The differences in the two embodiments reside solely in the use of two separate, spaced, hinge bars 34, the addition of a fourth L-shaped bracket 30, the structure of the bearing element 62, and the manner of connecting the bearing element 62 to the upper ramp segment 44 of a respective ramp assembly 43.

As seen in FIGS. 10 and 11, the second embodiment includes two spaced, cylindrical, hinge bars 34, each mounted within openings in L-shaped brackets 30 secured to the aft end of rear door 12 by threaded bolts 32. Each hinge bar 34 is likewise secured to respective brackets 30 through use of hair pin cotter keys 38 which pass through radial slots (not numbered) in the ends of each hinge bar 34. Also as seen in FIGS. 10 and 11, each bearing element 62 comprises a tubular member 63 and a flat plate 65 connected by welds 61 to tubular member 63 and a distal end which is split or divided into two pieces 75 and 77 such that the divided pieces 75 and 77 can be positioned on the side of the middle, longitudinal, reinforcing member 60 of each upper ramp segment 44. Each of the pieces 75 and 77 of second section 73 of the flat plate 65 has three spaced openings for receiving bolts 68 for securing the bearing element 62 to one end of the upper ramp segment 44 by use of threaded nuts 70 mounted on respective bolts 68. The opening (not numbered) of tubular member 63 receives a respective hinge bar 34 such that the bearing element 62 can both move in an arc and horizontally on a respective hinge bar 34.

The operation of the second embodiment as depicted in FIGS. 10 and 11 is the same as described hereinabove with respect to the embodiment depicted in FIGS. 1–9.

An alternative embodiment of the hinge bar bracket is shown in FIG. 12 and designated by the reference numeral 130. Hinge bar bracket 130 comprises a tubular member 132 and a flat plate 134 welded to tubular member 132. The flat plate 134 includes a pair of openings 136 for receiving externally threaded bolts (not shown) for anchoring each hinge bar bracket 130 to the rear door 12 of the van or trailer.

The foregoing is provided for purposes of illustration, explanation, and description of the preferred embodiment of the present invention. Modifications, variations and adaptations of this embodiment will be apparent to those of ordinary skill in the art and they may be made without departing from the scope or spirit of the invention. For examples, pimples or projections can be provided on the inner aluminum sheet 14 of door 12 for traction purposes, and for loading and unloading vehicles such as race cars from van 2, a single, but wide, ramp assembly could be used.

I claim:

1. In a vehicle having a load carrying bed and a pair of side walls, a ramp system comprising:
    a rear door hingedly secured to the load carrying bed of the vehicle, said rear door forming a first ramp segment and having a closed position and an opened position;
    a second ramp segment having an upper end portion and a lower end portion;
    a third ramp segment having an upper end portion and a lower end portion;
    means for hingedly securing said second ramp segment to said first ramp segment including a plurality of brackets, at least one round hinge bar mounted in said plurality of brackets, and a bearing element rigidly secured to said upper end portion of said second ramp segment and being pivotally secured to said at least one hinge bar;
    means for securing said lower end portion of said second ramp segment to said third ramp segment; and
    means for latching each of said second ramp segment and said third ramp segment to and against said first ramp segment when said rear door is in its closed position whereby said ramp system is compactly stored in a generally vertical condition to take up limited space within the vehicle when the ramp system is not being used for loading and unloading purposes.

2. The ramp system of claim 1 wherein said bearing element includes a channel for receiving said at least one hinge bar, and an extension for securing to said upper end portion of said second ramp segment, said bearing element being slidable in a horizontal plane on said at least one hinge bar to adjust the position of the ramp system.

3. The ramp system of claim 2 wherein said second ramp segment has elastomeric means secured to said lower portion of said second ramp segment for supporting said second ramp segment when it is in a loading and unloading position and an abrasive material secured thereto for traction purposes.

4. The ramp system of claim 3 wherein said means for securing said lower end portion of said second ramp segments to said third ramp segment includes at least one hinge member.

5. The ramp system of claim 4 wherein said first ramp segment has elastomeric means secured thereto for support of said first ramp segment when in its said opened position.

6. The ramp system of claim 5 wherein said means for latching said second ramp segment to said first ramp segment includes a hasp having a male member secured to said second ramp segment, a female member secured to said first ramp segment and a clasp fastener.

7. The ramp system of claim 6 further including means for urging said rear door from its opened position to its closed position in response to an initial impetus by an outside source.

8. The ramp system of claim 7 wherein said door has an aft end and said means for urging said rear door to its closed position includes at least one spring motor mounted on at least one of said side walls of the vehicle and at least one cable secured to said at least one spring motor and said aft end of said door.

9. In a vehicle having a load carrying bed and a pair of side walls, a ramp system comprising:

a rear door hingedly secured to the load carrying bed of the vehicle, said rear door forming a first ramp segment and having a closed position and an opened position;

a pair of second ramp segments, each having an upper end portion and a lower end portion;

a pair of third ramp segments, each having an upper end portion and a lower end portion;

means for hingedly securing each said second ramp segment to said first ramp segment including a plurality of brackets, at least one round hinge bar mounted in said plurality of brackets, and a bearing element rigidly secured to each said upper end portion of each said second ramp segment and being pivotally secured to said at least one hinge bar;

means for securing said lower end portion of each said second ramp segment to a respective said third ramp segment; and means for latching each said second ramp segment and each said third ramp segment to and against said first ramp segment when said rear door is in its closed position whereby said ramp system is compactly stored in a generally vertical condition to take up limited space within the vehicle when the ramp system is not being used for loading and unloading purposes.

10. The ramp system of claim 9 wherein each said bearing element includes a channel for receiving said at least one hinge bar, and an extension for securing to said upper end portion of a respective said second ramp segment, each said bearing element being slidable in a horizontal plane on said at least one hinge bar to adjust the position of the ramp system, and wherein said means for securing said lower end portion of each said second ramp segment to a respective said third ramp segment includes at least one hinge member, and wherein said means for latching each said second ramp segment to said first ramp segment includes a hasp having a male member, a female member and a clasp fastener.

11. The ramp system of claim 10 further including means for urging said rear door from its opened position to its closed position in response to an initial impetus by an outside source.

12. The ramp system of claim 11 wherein said door has an aft end and said means for urging said rear door to its closed position includes at least one spring motor mounted on at least one of said side walls of the vehicle and at least one cable secured to said at least one spring motor and said aft end of said door.

13. In a vehicle having a load carrying bed, a pair of side walls, and a cover, a ramp system for loading and unloading a second vehicle onto and off of the load carrying bed, said ramp system comprising:

a rear door hingedly secured to the load carrying bed of the vehicle, said rear door forming a first ramp segment and having a closed position and an opened position;

a pair of second ramp segments, each having an upper end portion and a lower end portion;

a pair of third ramp segments, each having an upper end portion and a lower end portion;

means for hingedly securing each said second ramp segment to said first ramp segment including a plurality of brackets, at least one round hinge bar mounted in said plurality of brackets, and a bearing element rigidly secured to each said upper end portion of each said second ramp segment and being pivotally secured to said at least one hinge bar, each said bearing element including a channel for receiving said at least one hinge bar to allow each said bearing element and respective second and third ramp segments to move horizontally along and perpendicular to said at least one hinge bar to accommodate second vehicles of varying wheelbases during loading and unloading thereof;

means for securing said lower end portion of each said second ramp segment to a respective said third ramp segment; and means for latching each said second ramp segment and each said third ramp segment to and against said first ramp segment when said rear door is in its closed position whereby said ramp system is compactly stored in a generally vertical condition to take up limited space within the vehicle when the ramp system is not being used for loading and unloading purposes.

14. The ramp system of claim 13 wherein said second ramp segment has elastomeric means secured to said lower portion of said second ramp segment for supporting said second ramp segment when it is in a loading and unloading position and an abrasive material secured thereto for traction purposes.

15. The ramp system of claim 14 wherein said means for securing said lower end portion of said second ramp segments to said third ramp segment includes at least one hinge member.

16. The ramp system of claim 15 wherein said first ramp segment has elastomeric means secured thereto for support of said first ramp segment when in its said opened position.

17. The ramp system of claim 16 wherein said means for latching said second ramp segment to said first ramp segment includes a hasp having a male member secured to said second ramp segment, a female member secured to said first ramp segment and a clasp fastener.

18. The ramp system of claim 17 further including means for urging said rear door from its opened position to its closed position in response to an initial impetus by an outside source.

19. The ramp system of claim 18 wherein said door has an aft end and said means for urging said rear door to its closed position includes a pair of spring motors, each mounted on one of said walls of the vehicle, and a pair of cables, each secured to one of said spring motors and one of said side walls of the vehicle.

* * * * *